United States Patent [19]

Chan

[11] Patent Number: 5,781,635

[45] Date of Patent: Jul. 14, 1998

[54] METHOD AND APPARATUS FOR IMPROVED DIGITAL MESSAGE TRANSACTION MODEL

[75] Inventor: Keen Chan, Aloha, Oreg.

[73] Assignee: Intel Corporation, Santa Clara, Calif.

[21] Appl. No.: 581,271

[22] Filed: Dec. 29, 1995

[51] Int. Cl.⁶ .................................................. H04L 9/00
[52] U.S. Cl. .................................................... 380/30
[58] Field of Search ...................................... 380/30

[56] References Cited

U.S. PATENT DOCUMENTS 5,373,561  12/1994  Haber et al. ............... 380/30

OTHER PUBLICATIONS

"Applied Cryptogrophy", Bruce Schneier, 1994, John Wiley and Sons, pp. 1–15.
"Certificate Extensions Architecture Document", Jul. 7, 1995 Draft, Intel Corporation, pp. 1–10.
"Confidential Communication On the Internet", Thomas Beth, Scientific American, pp. 88–91, Dec. 1995.
"Cryptology in Cyberspace", Edward J. Radlo, New Matter, The Official Pulication of the State Bar of California Intellectual Property Association, vol. 20, No. 3, pp. 44–48.

CCITT Recommendation X.509, The Directory–Authentication Framework, Melbourne, 1988, pp. 48–81.

"A Layman's Guide to a Subset of ASN.1, BER, and DER", RSA Labs Technical Note, Version 1.5, 11–93 revision, pp. 1–36.

"PKCS #6: Extended–Certificate Syntax Standard", TSA Labs Technical Note, Version 1.5, Nov. 1993 Revision, pp. 1–11.

"Some Examples of the PKCS Standards", RSA Labs Technical Note, Burton S. Kaliski Jr., Nov. 1993, Revision, pp. 1–15.

Primary Examiner—Salvatore Cangialosi
Attorney, Agent, or Firm—Blakely, Sokoloff, Taylor & Zafman

[57] ABSTRACT

The invention is a machine-readable medium for implementing an improved electronic transaction model. The machine-readable medium stores at least one non-certificate data block, at least one prior certificate, and a new certificate, the new certificate certifying a combination of less than all of a union of the at least one non-certificate data block and the at least one prior certificate.

16 Claims, 5 Drawing Sheets

METHOD AND APPARATUS FOR IMPROVED DIGITAL MESSAGE TRANSACTION MODEL

BACKGROUND

1. Field of the Invention

The inventions relates to the field of digital transactions, and more particularly to digital signatures for certifying electronic data.

2. Art Background

General Theory

In a typical digital message transaction, a first party (the sender) wants to send a digital message to a second party (the receiver) using a digital transmission medium (such as the Internet). The sender wants to ensure that a third party (the intermediary) cannot modify the message in any way. Specifically, the sender wants to ensure that the intermediate cannot intercept and read or modify the digital message.

In the following discussion, plaintext, that is, an un-encrypted message, is denoted by the symbol P. Plaintext can be a stream of bits, a text file, a stream of digitized voice, or a digital video image, to present just a few of the many possibilities. From the perspective of a digital computer, P is simply binary data.

Ciphertext, that is, encrypted data, is denoted by C. Like plaintext, ciphertext is also binary data. The encryption function E operates on P to produce C. Or, in mathematical notation:

$$E(P)=C$$

In the reverse process, the decryption function D operates on C to produce P:

$$D(C)=P$$

Since the whole point of encrypting and then decrypting a message is to recover the original plaintext, the following identity must hold true:

$$D(E(P))=P$$

A cipher is the mathematical function used for encryption and decryption of plaintext. To encrypt a plaintext message, the sender applies an encryption algorithm to the plaintext, producing ciphertext. The ciphertext is then transmitted to the receiver. A prying intermediary cannot read the ciphertext, because it is encrypted. To read a ciphertext message, the intended receiver applies a decryption algorithm to the ciphertext, resulting in plaintext which is readable.

Modern encryption algorithms use a key, denoted by k. The key is typically a number, and can take on many values, although the most effective keys are large numbers. The range of possible values of the key is called the keyspace. The value of the key affects the encryption and decryption functions, so the encryption and decryption functions now become a function of the key:

$$E_k(P)=C$$

$$D_k(C)=P$$

If the encryption key and the decryption key are the same, then:

$$D_k(E_k(P))=P$$

Some algorithms use an encryption key and a decryption key which are not identical. That is, the encryption key, $k_1$, differs from the corresponding decryption key, $k_2$. In this case:

$$E_{k_1}(P)=C$$

$$D_{k_2}(C)=P$$

$$D_{k_2}(E_{k_1}(P))=P$$

When the encryption key k1 is identical to the decryption key k2, and vice-versa, the encryption/decryption algorithms are said to be symmetric. Symmetric algorithms require the sender and receiver to agree on the key before passing messages back and forth. This key must be kept secret. The security of a symmetric algorithm rests in the key; anyone who obtains the key may decrypt and read, or decrypt, modify, and re-encrypt, messages from the sender to the receiver. Encryption and decryption using a symmetrical algorithm is denoted by:

$$E_{k_1}(P)=C$$

$$D_{k2}(C)=P$$

Symmetric algorithms are further divided into two categories. Algorithms which operate on the plaintext a single bit at a time are called stream algorithms. Those that operate on the plaintext in groups of bits, called blocks, are called block algorithms. Block algorithms implemented on computers typically use blocks which are 64 bits in size. In both block and stream symmetrical algorithms, the same key is used for both encryption and decryption.

Public-key algorithms are designed so that the key used for encryption is different from the key used for decryption. That is, public-key algorithms are not symmetric. In public-key algorithms, the decryption key cannot be readily calculated from the encryption key. The encryption key can be made public: a complete stranger can use the encryption key to encrypt a message, but only someone with the corresponding decryption key can decrypt the message. In these systems, the encryption key is often called the public key, and the decryption key is often called the private key.

Public-key encryption, using public key k1, is denoted by:

$$E_{k1}(P)=C$$

Although the public key and private key are different, decryption with the corresponding private key is denoted by:

$$D_{k2}(C)=P$$

Sometimes, messages will be encrypted with the private key and decrypted with the public key. Such a scheme is used with digital signatures, and the same mathematical symbolism is used whether the public key is used for encryption or decryption.

$$E_{k1}(P)=C$$

$$D_{k2}(C)=P$$

Digital Signatures

Signatures are useful for certifying digital messages. A digital message, either plaintext or ciphertext, is made up of a number of bits of information. A digital signature which uniquely identifies a digital message is generated in the following manner. First, a unique identifier for the digital message is generated by means of a one-way hash function.

This identifier typically comprises a sequence of bits which in many cases is 512 bits long. Using a public key algorithm, this identification is then encrypted using the private key of the owner of the digital document, who is also known as the signer. The use of a one-way hash function to generate the identification ensures that false information cannot be substituted for the original data in the digital message. The subsequent encryption of the identification generated by the hash function ensures that the signature cannot be forged. Once the signature has been generated, the message and signature are sent to the receiving party. To verify that the message was not altered during transmission, the recipient of the signed message again applies the one-way hash function to the message and then compares the resulting identification with the one obtained by deciphering the signature using the public key of the signer. If the message has been altered, then the identification which results from the receiver applying the one-way hash function to the document will be different then the one obtained by deciphering the signature using the public key.

FIG. 1A shows a prior art computer system for certifying a digital data block. A machine readable medium 130 such as a RAM or hard disk stores character data display logic 135. This character data display logic 135 is used to display character data 149 which is stored in a data block 147. The medium 130 further stores certification logic 145 for generating and verifying a digital signature for the character data 149. The character data display logic 135 is accessed by the processor 120 over bus element 140. When executed on the processor 120 upon the character data 149, the character data display logic 135 generates a visual display 105 of the character data 149 on a display area 104 of the computer monitor 100. In this example, the character data when displayed spells out the words "hello world" 105. The computer system may also comprise a keyboard 150 coupled to the bus 140 so that a human user can type in their own character data 149 for certification.

FIG. 1B shows the same computer system after a first digital signature is generated for the data block 147. Data block 147 now contains the character data 149 and a first signature block 169. The character display logic 135 does not recognize the digital signature 169 because the digital signature 169 is not in the character data format, it is not purely character data. Rather, it is comprised of a sequence of bits which do not necessarily represent human readable alpha-numeric characters. As a consequence, the computer display area 104 now shows the character data 105 and also a sequence of non-alphanumeric characters 107 representing the character data display logic 135 attempt at displaying the digital signature 169 in character format. The representation 107 of the digital signature 169 is highly distracting to a human reader and is generally meaningless.

FIG. 1C shows the computer system of FIG. 1B after a second digital signature 170 is generated for the data block 147. The second digital signature 170 certifies not only the character data 149, but also the first signature block 169. Character data display logic 135 attempts to display the character data 149 along with the first signature 169 and second signature 170. But for the reasons described above, both the first and second signatures 169, 170 cannot be rendered by the character data display logic 135 in a manner which is meaningful to the human user. Rather, the two signatures 169, 170 are displayed as binary "garbage" 107 on the computer display.

Improvements Needed

It would be desirable to eliminate the unpleasant visual effects associated with displaying signatures appended to digital messages, using standard facilities of modern computer operating systems. These standard facilities include methods by which a signature can identify the logic to use for rendering the signature on a display device. It would also be desirable if a digital signature was not restricted to certifying all of the data in a disk file, but instead could be used to certify only the message data, a prior signature, or any combination of the message data and any number of prior signatures. One disadvantage of the prior art certification scheme depicted in FIGS. 1A–1C is that it certifies all of the data in a data block including any prior signatures which are contained along with message data. Human transaction models require more flexibility than this scheme permits. For example, a message which must be read and approved by three persons may require a more flexible transaction model. The first person reads the message and applies his digital signature, indicating he has read and approved the contents of the message. The second person reads the message and applies his signature to it. However, the data block now consists of both the message data and the first party's signature. By certifying the entire data block, instead of only the original message data, the second party certifies that he has read and approved of the message data and further certifies that the first party did also. In other words, the second party certifies both the message and the first party's signature. Likewise, when the third party reads the message and then certifies the file, he certifies not only the message data but also the first and second party's signatures.

Another real world example in which greater transaction flexibility is required is with passports and visas. Countries attach visa certificates to the passports of parties who enter the country. If the person has visited other countries prior to the current one he is entering, then the passport may have previous visas attached. When an entry visa is applied to a passport, it certifies only the passport for that particular country; it does not certify the visas of countries which may have been previously applied. A more flexible transaction model would help enable digital processing of visas and passports.

SUMMARY OF THE INVENTION

The invention is a machine-readable medium storing at least one non-certificate data block, at least one prior certificate, a new certificate which certifies a combination of less than all of a union of the at least one non-certificate data block and the at least one prior certificate, a mechanism which allows users to directly manipulate an control all the aforementioned components through a graphical user interface.

DETAILED DESCRIPTION

In the following description, numerous specific details are set forth such as system diagrams, flow diagrams, etc. in order to provide a thorough understanding of the present invention. In other instances, well-known structures and techniques have not been shown in detail because to do so could unnecessarily obscure the present invention. The specific arrangements and methods described herein are merely illustrative of the principles of the present invention. Numerous modifications in form and detail may be made by those of ordinary skill in the art without departing from the scope of the present invention. For example, although later certificates (later in time) are shown in the figures as being embedded to the end of the data to certify, one skilled in the art will readily appreciate that the certificates may be embedded at any location within the data.

Figure 1A:
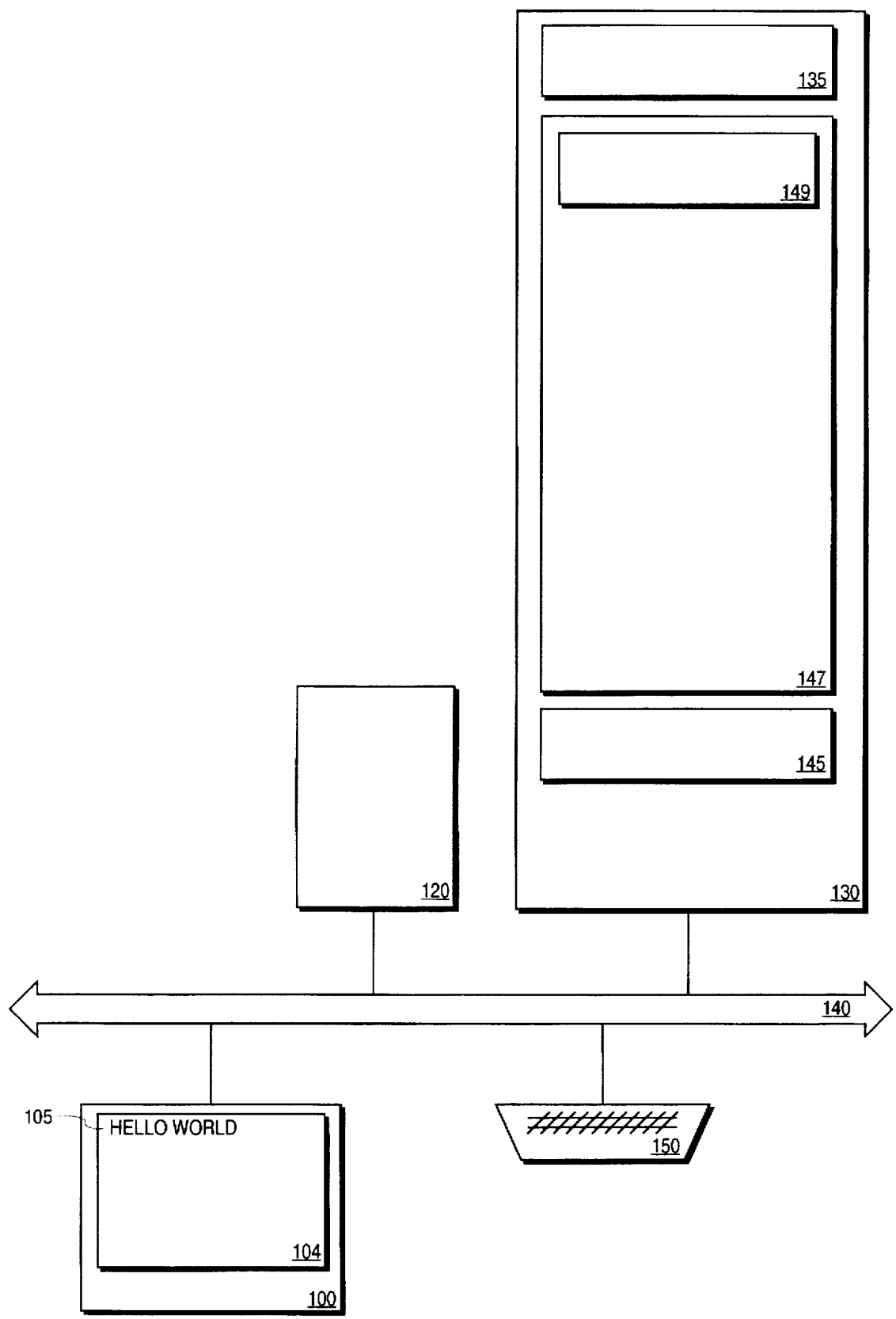
FIG. 1A. shows a prior-art computer system for certifying digital data block
Figure 1B:
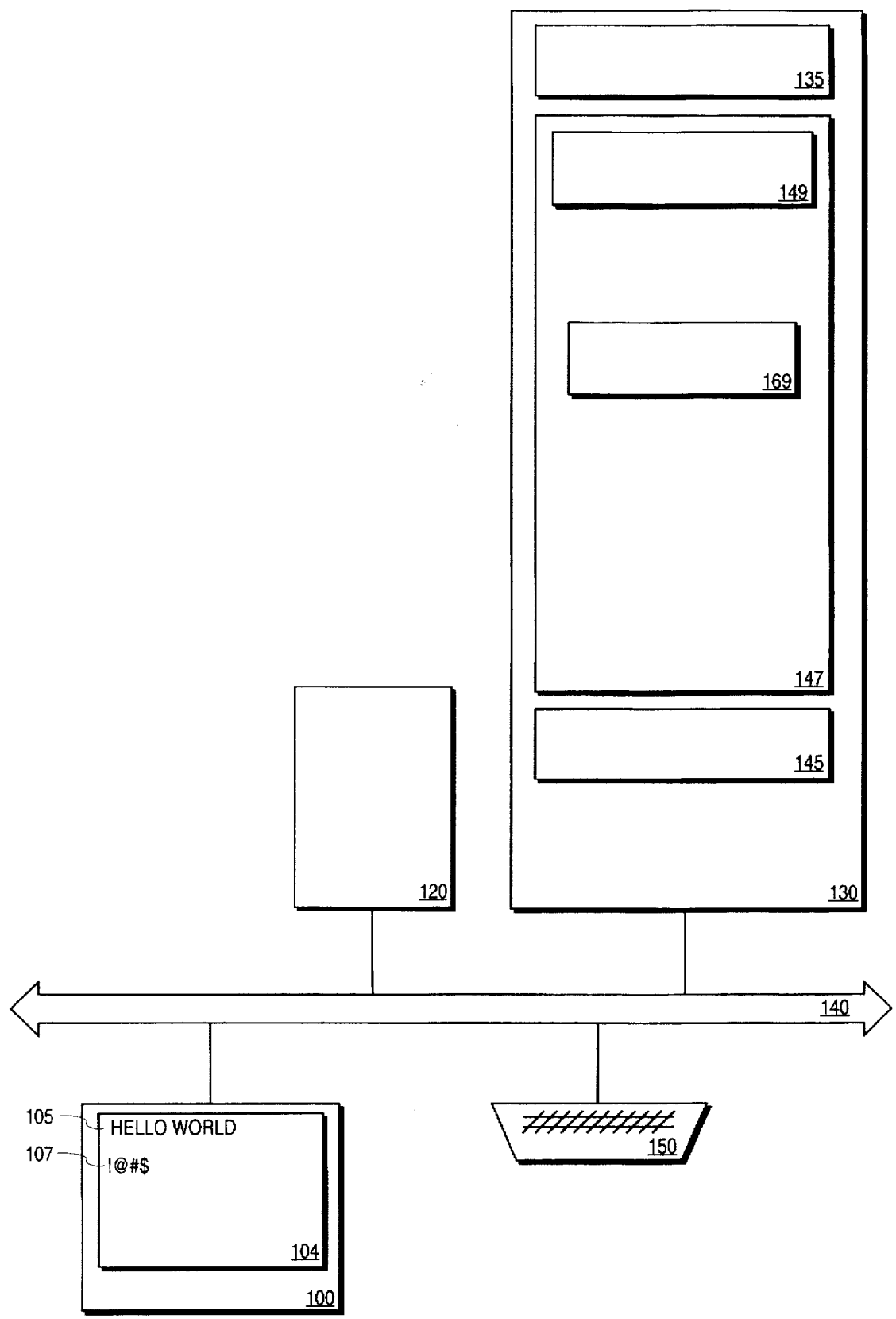
FIG. 1B. shows the computer system of FIG. 1A after a first digital signature is generated for the data block.
Figure 1C:
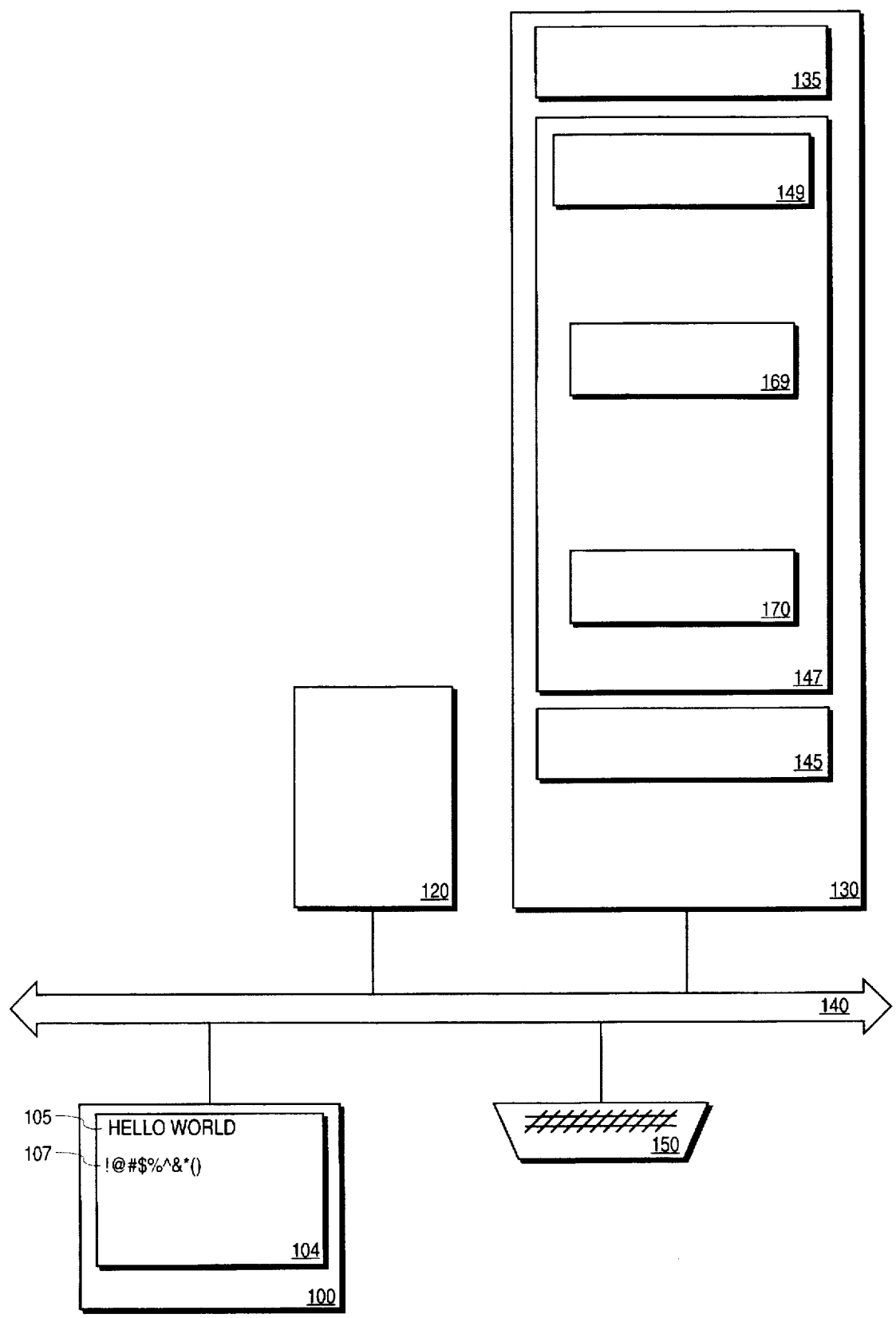
FIG. 1C. shows the computer system of FIG. 1B after a second digital signature is generated for the data block FIG. 2A. illustrates a computer system for certifying a data block.
Figure 2A:
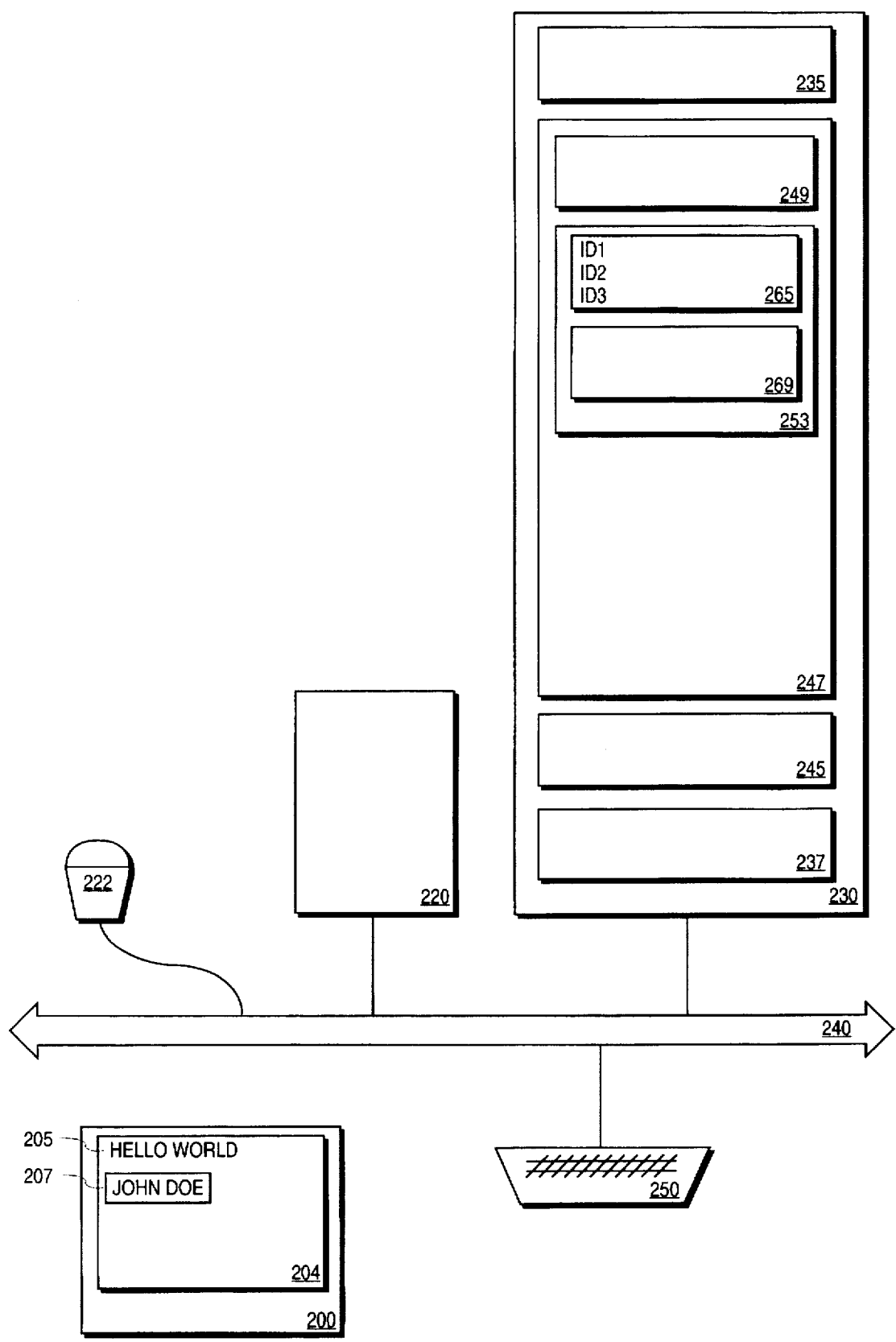
FIG. 2B. shows the computer system of FIG. 2A, in which a second certificate has been added to the data block

FIG. 2A shows a computer system for certifying a data block 247. The system includes a machine-readable medium 230 for storing program logic and data. The medium 230 contains a data block 247, and this data block contains a (non-certificate) character data block 249 and also a first certificate 253. The first certificate 253 comprises a first signature 269 and also a first dynamic link block 265 which is described in detail below. The medium 230 also includes a certification logic block 245, a signature display logic block 237, and a character display logic block 235. The certification logic block 245 contains logic which, when executed on processor 220, generates the first signature 269 for character data block 249. The signature display logic block 237 contains logic for displaying the first signature 269 on the computer display 204 within the computer monitor 200, in a manner which is meaningful to a human user. Likewise, the character display logic block 235 contains logic for displaying the character data 249 on the computer display 204. Each of the blocks stored on medium 230 is accessible by computer processor 220 over bus element 240. A keyboard 250 is available to allow a human user to enter the character data block 249.

Within the first certificate 253, the first dynamic link block 265 contains an identification ID3 of the character data block 249 which the first signature 269 verifies. The first dynamic link block 265 also contains an identification ID1 of the certification logic block 245 for verifying that the first signature 269 accurately verifies the character data block 249. The first dynamic link block 265 also contains an identification ID2 of the signature display logic block 237. In this case the character data block 249, once displayed, comprises the words "hello world" 205. The first signature block 269, once displayed by signature display logic 237 executing on processor 220, comprises a bitmapped signature image 207. The first signature block 269 is displayed in human-readable form because the signature display logic 237 understands the digital format of the first signature block 269 and is able to display it in a meaningful way to humans. The character data display logic 235 typically inputs the entire data block 247 including the character data 249 and first certificate 253. The character data display logic 235 displays the character data block 249 of the data block 247. The identification ID2 of the signature display logic 237, the identification ID1 of the certification logic block 245, and the identification ID3 of the character data block comprised by the first dynamic link block 265 are implemented using standard facilities of the operating system which controls the computer system in FIG. 2A. Because the character data display logic 235 recognizes the identification ID2 in the first dynamic link block 265 and invokes the signature display logic 237 to display the first signature block 269, instead of attempting to display the first signature block 269 as character data. An example of a standard operating system facility for making the identifications ID1, ID2, and ID3 is the Object Linking and Embedding (OLE) standard for the Windows™ operating system.

The character data display logic 235 uses the identification ID1 of the certification logic block 245 for confirming that the first signature 269 accurately verifies the (non-certificate) character data block 249. The human user can cause the character data display logic 235 to do this by selecting the bitmapped signature image 207 using either the keyboard 250 or the mouse 222. When the bitmapped signature image 207 is selected, character data display logic 235 invokes the certification logic 245 on the first signature block 269 and character data block 249. The certification logic 245 then generates a signature using a hash function, decrypts the first signature block 269 using a public key, and compares the newly generated signature with the decrypted signature. If the signatures match, then first signature block 269 is verified.

Figure 2B:
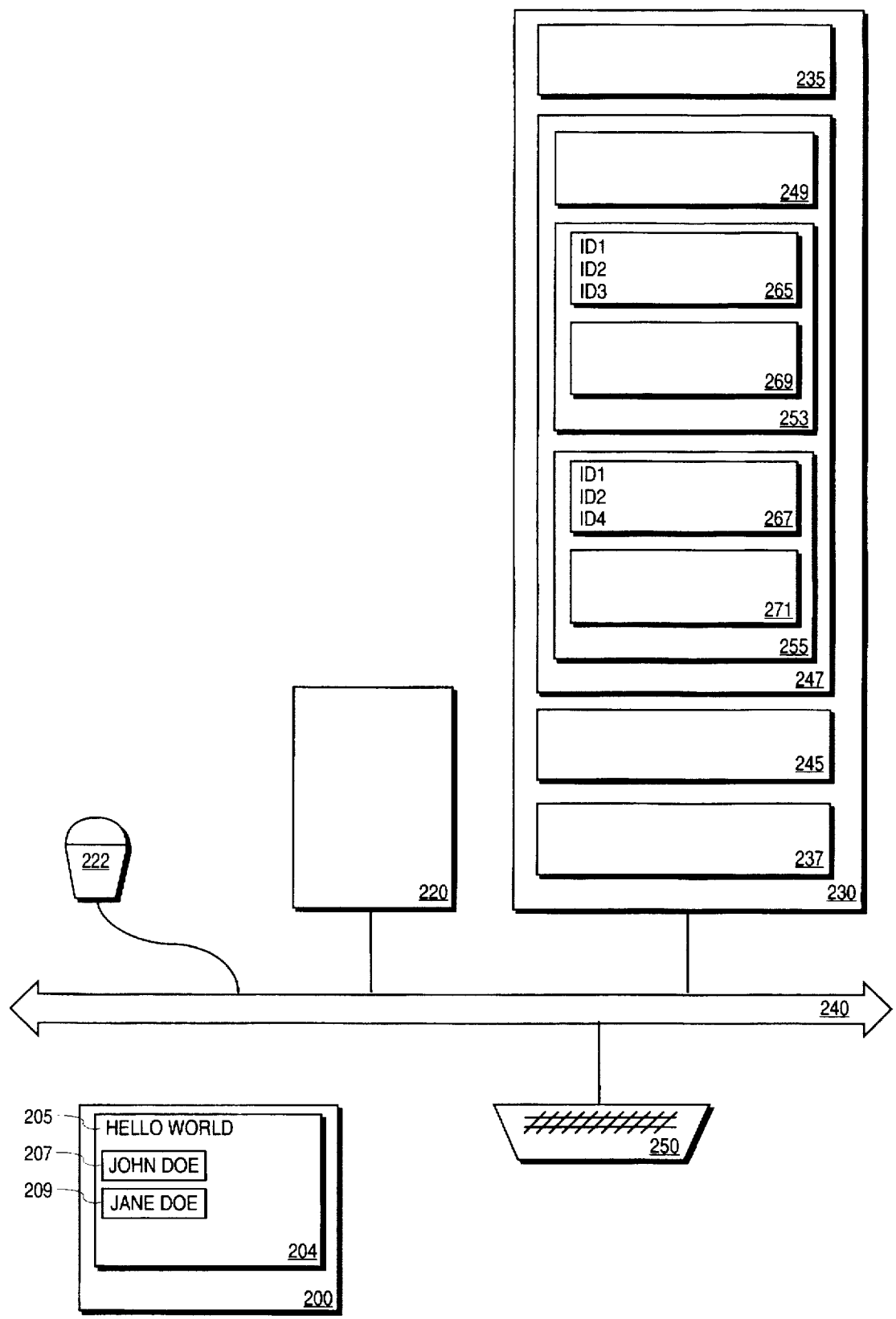

In FIG. 2B, a second certificate 255 is added to the data block 247. The second certificate 255 comprises a second dynamic link block 267 and a second signature block 271. The second dynamic link block 267 comprises an identification ID4 of the data which the second certificate block 255 certifies; in this example the identification ID4 may indicate the (non-certificate) character data block 249, the first certificate 253, or a combination of both. The second dynamic link block 267 also contains an identification ID1 of the certification logic block 245 and identification ID2 of the signature display logic 237. Assuming for the purpose of this example that the second signature block 271 verifies only the first certificate 253, then the character data display logic 235 uses the identification ID1 of the certification logic block 245 for verifying that the second signature 269 accurately verifies the first certificate 253. The human user can cause the character data display logic 235 to do this by selecting the second bitmapped signature image 209 using either the keyboard 250 or the mouse 222.

The character data display logic 235, the signature display logic 237, and the certification logic block 245 are typically comprised of sequences of computer instructions in an executable format familiar to the processor. The identification ID1 of the certification logic block 245 and the identification ID2 of the signature display logic 237 may comprise full path name descriptions for locating the logic on the computer system through use of the operating system, depending on the operating system implementation. The identifications ID3, ID4 of the data to certify typically comprise a data pointer. Although the display 200 is shown as a video display for purposes of illustration, the display 200 may also be a printer, plotter, or other means of displaying digital data.

One skilled in the art will appreciate that the data blocks stored on machine-readable medium 230 need not be stored in any particular arrangement with respect to one another. Also, within the data block 247 the first certificate 253 and second certificate 255 can be stored in any arrangement. Within each certificate, the signature and dynamic link blocks may be stored in any arrangement.

The machine-readable medium 230 may be a hard disk, a Random-Access-Memory (RAM), a cache memory, a Read-Only-Memory (ROM), a flash memory, or any other form of memory device which is capable of storing data and code which is executed by a processor element 220. In this example the machine-readable medium 230 and the processor 220 are shown as separate elements, however, one skilled in the art of computer systems will readily appreciate that they may be combined into a single integrated device, such as with on-chip flash memories. One skilled in the art will also appreciate that bus element 240 may be implemented in numerous ways familiar in the art of processor system design, for example, using an electrically conductive material, or using optical coupling.

Although this invention has been shown in relation to a particular embodiment, it should not be considered so limited. Rather, the invention is limited only by the scope of the appended claims.

What is claimed is:

1. A machine-readable medium having contained:
   at least one non-certificate data block;
   at least one prior certificate;
   a new certificate which certifies a combination of less than all of a union of the at least one non-certificate data block and the at least one prior certificate; and
   a user interface for selecting the new certificate and for rendering the new certificate in human readable form.

2. The machine-readable medium of claim 1 in which the new certificate further comprises digital signature and an identification of logic for rendering the digital signature in human readable form.

3. The machine-readable medium of claim 1 in which the new certificate further comprises an identification of logic to verify the digital signature.

4. The machine-readable medium of claim 2 in which the rendition of the digital signature on the display device further comprises a bitmapped facsimile of the human user's handwritten signature.

5. A computer system comprising:
   a processor; and
   a machine-readable medium, the machine readable medium having contained at least one non-certificate data block, at least one prior certificate, a new certificate which certifies a combination of less than of all union of the at least one non-certificate data block and the at least one prior certificate, and a user interface for selecting the new certificate and for rendering the new certificate in human readable form;
   wherein the new certificate is generated by inputting the combination of less than all of a union of the at least one non-certificate data block and the at least one prior certificate to certification logic executing on the processor.

6. The computer system of claim 5 in which the new certificate further comprises a digital signature and an identification of logic for rendering the digital signature in human readable form.

7. The computer system of claim 5 in which the new certificate further comprises an identification of logic to verify the digital signature.

8. The computer system of claim 6 in which the rendition of the digital signature on the display device further comprises a bitmapped facsimile of the human user's handwritten signature.

9. A means for storing machine-readable data having contained:
   at least one non-certificate data block;
   at least one prior certificate;
   a new certificate which certifies a combination of less than all of a union of the at least one non-certificate data block and the at least one prior certificate; and
   a user interface for selecting the new certificate and for rendering the new certificate in human readable form.

10. The means for storing machine-readable data of claim 9 in which the new certificate further comprises a digital signature means and a means for identifying a means for generating a rendition of the digital signature means on a means for display digital data and making the digital signature means meaningful to a human user.

11. The means for storing machine-readable data of claim 9 in which the digital signature means further comprises a means for verifying the digital signature means.

12. The means for storing machine-readable data of claim 10 in which the rendition of the digital signature means on the means for displaying digital data further comprises a bitmapped facsimile of the human user's handwritten signature.

13. A computer system comprising:
    means for processing digital data; and
    means for storing machine-readable data, the means for storing machine readable data having contained at least one non-certificate data block, at least one prior certificate, a new certificate which certifies a combination of less than all of a union of the at least one non-certificate data block and the at least one prior certificate, and a user interface for selecting the new certificate and for rendering the new certificate in human readable form;
    wherein the new certificate comprises a digital signature means, the digital signature means verified by inputting the combination of less than all of a union of the at least one non-certificate data block and the at least one prior certificate to means for verifying the signature, the means for verifying the digital signature means executing on the means for processing digital data.

14. The computer system of claim 13 in which the new certificate further comprises means for identifying means for generating a rendition of the digital signature means on a means for displaying digital and making the digital signature means meaningful to a human user.

15. The computer system of claim 13 in which the new certificate further comprises means for identifying the means for verifying the digital signature means.

16. The computer system of claim 14 in which the rendition of the digital signature means on the means for displaying digital data further comprises a bitmapped facsimile of the human user's handwritten signature.

* * * * *